United States Patent
Caprioli et al.

(10) Patent No.: US 7,293,163 B2
(45) Date of Patent: *Nov. 6, 2007

(54) METHOD AND APPARATUS FOR DYNAMICALLY ADJUSTING THE AGGRESSIVENESS OF AN EXECUTE-AHEAD PROCESSOR TO HIDE MEMORY LATENCY

(75) Inventors: Paul Caprioli, Mountain View, CA (US); Sherman H. Yip, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 10/807,093

(22) Filed: Mar. 22, 2004

(65) Prior Publication Data

US 2005/0210223 A1 Sep. 22, 2005

(51) Int. Cl.
G06F 9/30 (2006.01)
G06F 9/40 (2006.01)
G06F 15/00 (2006.01)

(52) U.S. Cl. ............... 712/218; 712/214; 712/216; 712/219

(58) Field of Classification Search ........ 712/214, 712/216, 219
See application file for complete search history.

(56) References Cited

U.S. PATENT DOCUMENTS

2005/0081195 A1* 4/2005 Chaudhry et al. ......... 717/154

FOREIGN PATENT DOCUMENTS

EP 0 357 188 3/1990

OTHER PUBLICATIONS

IBM Technical Disclosure Bulletin entitled "Deferred decodeing", vol. 27, No. 10B, Mar. 1985 IBM Corp., pp. 6257-6258, XP-000885126.

Publication entitled "Runahead Execution: An Alternative to Very Large Instruction Windows for Out-of-order Processors", by Onur Mutlu et al., Proceedings of The Ninth International Symposium on High-Performance computer Architeture, IEEE, 2002.

Publication entitled "Beating in-order Stalls with "Flea-Flicker" two-pass Pipelining", by Ronald D. Barnes et al., Proceedings of the 36th International Symposium on Microarchitecture, IEEE, 2003.

* cited by examiner

Primary Examiner—Alford Kindred
Assistant Examiner—Jesse Moll
(74) Attorney, Agent, or Firm—Park, Vaughan & Fleming LLP

(57) ABSTRACT

One embodiment of the present invention provides a system that dynamically adjusts the aggressiveness of an execute-ahead processor. If a data-dependent stall condition is encountered during program execution, the system enters an execute-ahead mode, wherein instructions that cannot be executed because of the unresolved data dependency are deferred, and other non-deferred instructions are executed in program order. If a non-data-dependent stall condition is encountered during execute-ahead mode, the system enters a scout mode, wherein instructions are speculatively executed to prefetch future loads, but results are not committed to the architectural state of the execute-ahead processor. On the other hand, if an unresolved data dependency is resolved during the execute-ahead mode, enters a deferred mode and executes deferred instructions. During this deferred mode, if some instructions are deferred again, the system determines whether to resume execution in the execute-ahead mode. If it determines to do so, the system resumes execution in the execute-ahead mode, and otherwise resumes execution in a non-aggressive mode.

18 Claims, 3 Drawing Sheets

METHOD AND APPARATUS FOR DYNAMICALLY ADJUSTING THE AGGRESSIVENESS OF AN EXECUTE-AHEAD PROCESSOR TO HIDE MEMORY LATENCY

RELATED APPLICATION

The subject matter of this application is also related to the subject matter in a co-pending non-provisional application by Shailender Chaudhry and Marc Tremblay, entitled, "Selectively Deferring the Execution of Instructions with Unresolved Data Dependencies as They Are Issued in Program Order," having serial number TO BE ASSIGNED, and filing date TO BE ASSIGNED.

BACKGROUND

1. Field of the Invention

The present invention relates to techniques for improving the performance of computer systems. More specifically, the present invention relates to a method and an apparatus for speeding up program execution by dynamically adjusting the aggressiveness of an execute-ahead processor, wherein the execute-ahead processor selectively defers execution of instructions with unresolved data-dependencies as they are issued for execution in program order.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that are available for register renaming purposes during out-of-order execution also limits the effective size of the issue queue.

Some designers have proposed a scout-ahead execution mode, wherein instructions are speculatively executed to prefetch future loads, but wherein results are not committed to the architectural state of the processor. For example, see U.S. Pat. No. 6,415,356, entitled "Method and Apparatus for Using an Assist Processor to Pre-Fetch Data Values for a Primary Processor," by inventors Shailender Chaudhry and Marc Tremblay. This solution to the latency problem eliminates the complexity of the issue queue and the rename unit, and also achieves memory-level parallelism. However, it suffers from the disadvantage of having to re-compute any computational operations that are performed while in scout-ahead mode.

Hence, what is needed is a method and an apparatus for hiding memory latency without the above-described drawbacks of existing processor designs.

SUMMARY

One embodiment of the present invention provides an execute-ahead processor system that solves some of the above-described problems. If a data-dependent stall condition is encountered during program execution, the system enters an execute-ahead mode, wherein instructions that cannot be executed because of the unresolved data dependency are deferred, and other non-deferred instructions are executed in program order. If a non-data-dependent stall condition is encountered during execute-ahead mode, the system enters a scout mode, wherein instructions are speculatively executed to prefetch future loads, but results are not committed to the architectural state of the execute-ahead processor. On the other hand, if an unresolved data dependency is resolved during the execute-ahead mode, the system enters a deferred mode and executes deferred instructions. During this deferred mode, if some instructions are deferred again, the system determines whether to resume execution in the execute-ahead mode. If it determines to do so, the system resumes execution in the execute-ahead mode, and otherwise resumes execution in a non-aggressive mode.

In a variation on this embodiment, resuming execution in the non-aggressive execution mode involves remaining in the deferred mode until all deferred instructions are executed and the system returns to a normal execution mode.

In another variation on this embodiment, resuming execution in the non-aggressive mode involves resuming execution in a non-aggressive execute-ahead mode, wherein if a non-data-dependent stall condition is encountered, the execute-ahead processor does not enter the scout mode, but instead waits for the non-data-dependent stall condition to be resolved, or for an unresolved data dependency to return, before proceeding.

In a variation on this embodiment, while entering the execute-ahead mode, the system generates a checkpoint, which can be used to return execution to the instruction that caused the system to enter the execute-ahead mode. The system then executes subsequent instructions in the execute-ahead mode.

In a further variation, if the launch point stall condition (the unresolved data dependency or the non-data-dependent stall condition that originally caused the execute-ahead processor to exit the normal execution mode) is finally resolved, the system uses the checkpoint to resume execution in the normal execution mode from the launch point instruction (the instruction that originally encountered the launch point stall condition).

In a variation on this embodiment, executing deferred instructions in the deferred mode involves; issuing deferred instructions for execution in program order; deferring execution of deferred instructions that still cannot be executed because of unresolved data dependencies; and executing other deferred instructions that are able to be executed in program order.

In a further variation, if all deferred instructions are executed in the deferred mode, the system returns to a normal execution mode to resume normal program execution from the point where the execute-ahead mode left off.

In a further variation, if some deferred instructions are deferred again, the system returns to the execute-ahead mode at the point where execute-ahead mode left off.

In a variation on this embodiment, the unresolved data dependency can include; a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

In a variation on this embodiment, the non-data-dependent stall condition can include, a memory barrier operation, a load buffer full condition, or a store buffer full condition.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Execute-Ahead Processor

Figure 1A:
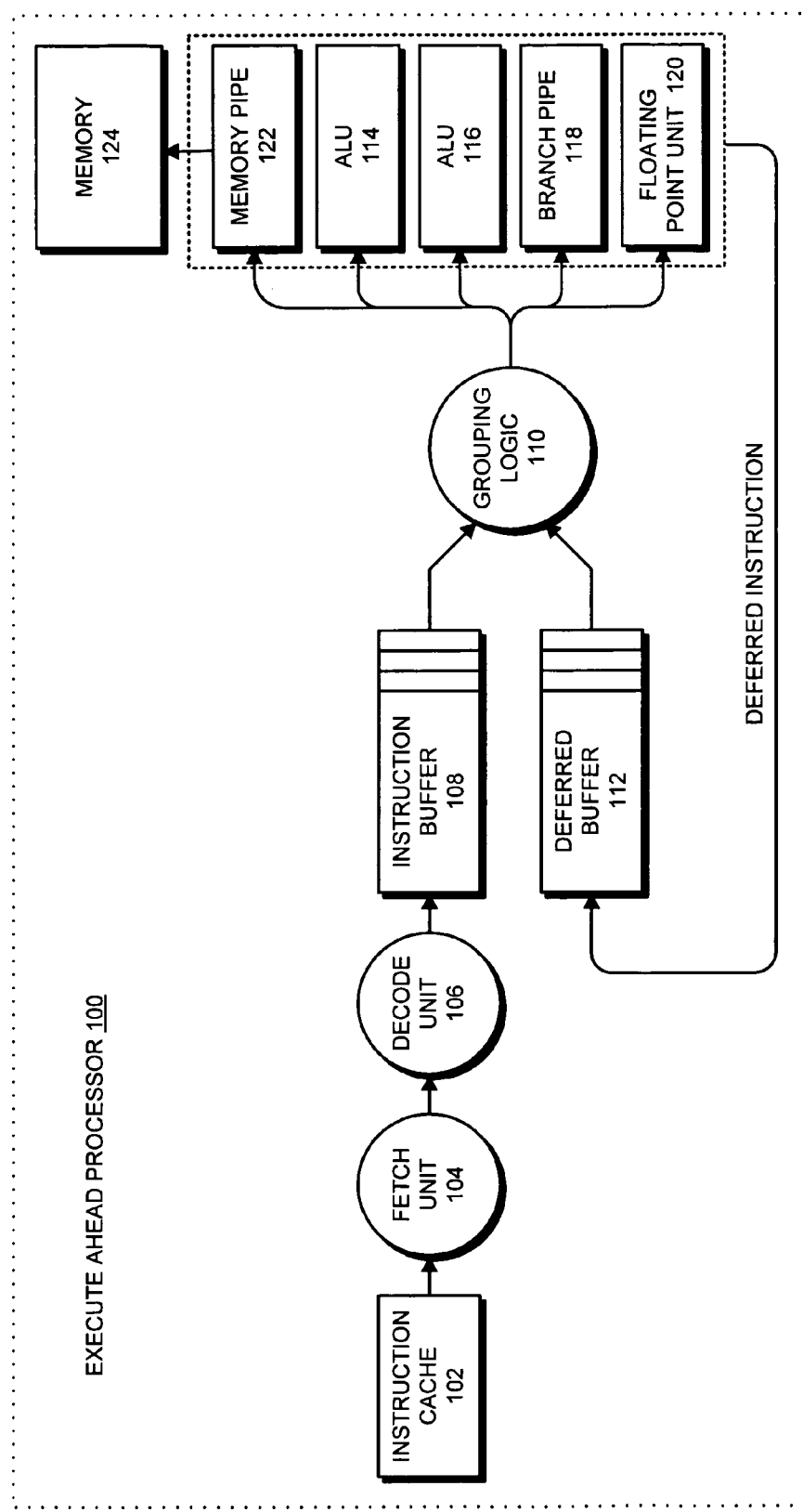
FIG. 1A illustrates a processor in accordance with an embodiment of the present invention.

FIG. 1A illustrates the design of an execute-ahead processor 100 in accordance with an embodiment of the present invention. Execute-ahead processor 100 can generally include any type of processor, including, but not limited to, a microprocessor, a mainframe computer, a digital signal processor, a personal organizer, a device controller and a computational engine within an appliance. As is illustrated in FIG. 1, execute-ahead processor 100 includes instruction cache 102, fetch unit 104, decode unit 106, instruction buffer 108, deferred buffer 112, grouping logic 110, memory pipe 122, memory 124, arithmetic logic unit (ALU) 114, ALU 116, branch pipe 118 and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred buffer 112. Note that like instruction buffer 108, deferred buffer 112 is also organized as a FIFO buffer.

When the data dependency is eventually resolved, instructions from deferred buffer 112 are executed in program order with respect to other deferred instructions, but not with respect to other previously executed non-deferred instructions. This process is described in more detail below with reference to FIG. 2.

Keeping Track of Dependencies

The present invention keeps track of data dependencies in order to determine if an instruction is subject to an unresolved data dependency. In one embodiment of the present invention, this can involve maintaining state information for each register, which indicates whether or not a value in the register depends on an unresolved data dependency.

Figure 1B:
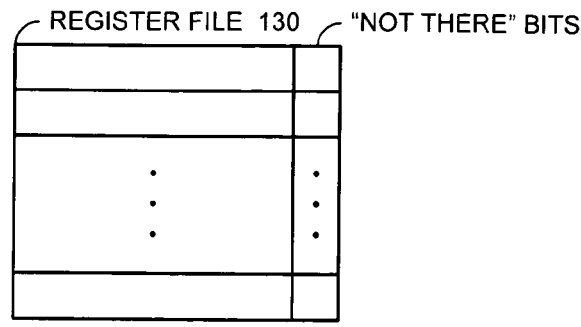
FIG. 1B illustrates a register file in accordance with an embodiment of the present invention.

For example, FIG. 1B illustrates a register file 130 in accordance with an embodiment of the present invention. Each register in register file 130 is associated with a "not-there" bit, which keeps track of whether a valid operand value is contained in the register, or if the operand cannot be produced because of an unresolved data dependency. If the register is waiting for an operand to return (for example, from a load operation), the corresponding not-there bit is set to indicate that the desired operand value is not present in the register. When a subsequent instruction references a source operand value that is marked as not-there, and generates a result that is stored in a destination register, the system marks the destination register as not-there to indicate that the value in the destination register also depends on the unresolved data-dependency. This can be accomplished by marking the not-there bit of the destination register with the "OR" of the not-there bits for source registers of the instruction.

State Diagram

Figure 2:
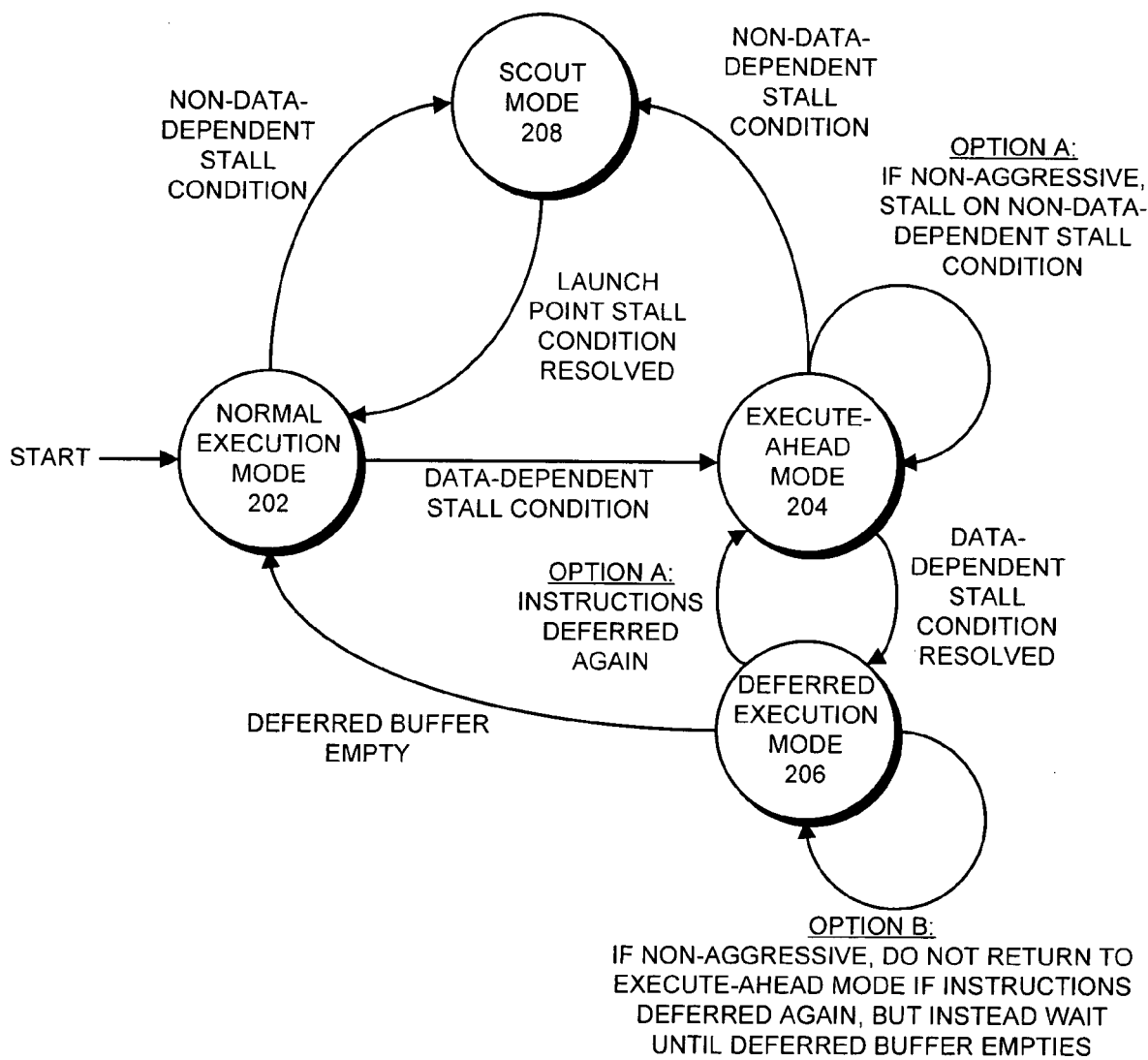
FIG. 2 presents a state diagram which includes the execute-ahead mode in accordance with an embodiment of the present invention.

FIG. 2 presents a state diagram which includes the execute-ahead mode in accordance with an embodiment of the present invention. The system starts in normal execution mode 202, wherein instructions are executed in program order as they are issued from instruction buffer 108 (see FIG. 1).

Next, if an unresolved data dependency arises during execution of an instruction, the system moves to execute-ahead mode 204. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 204, the system performs a checkpointing operation to generate a checkpoint that can be used, if necessary, to return execution of the process to the point where the unresolved data dependency was encountered; this point is referred to as the "launch point." (Note that generating the checkpoint can involve saving the precise architectural state of the processor to facilitate subsequent recovery from exceptions that arise during execute-ahead mode or deferred mode.) The system also "defers" execution of the instruction that encountered the unresolved data dependency, and stores the deferred instruction in deferred buffer 112.

Within execute-ahead mode 204, the system continues to execute instructions in program order as they are received from instruction buffer 108, and any instructions that cannot execute because of an unresolved data dependency are stored in deferred buffer 112.

If a non-data-dependent stall condition arises while the system is in normal execution mode 202 or in execute-ahead mode 204, the system moves into scout mode 208. (This non-data-dependent stall condition can include: a memory barrier operation; a load buffer full condition; a store buffer full condition, or a deferred buffer full condition.) In scout mode 208, instructions are speculatively executed to prefetch future loads, but results are not committed to the architectural state of the processor.

Scout mode is described in more detail in U.S. Pat. No. 6,415,356, entitled "Method and Apparatus for Using an Assist Processor to Pre-Fetch Data Values for a Primary Processor," by inventors Shailender Chaudhry and Marc Tremblay. It is also described in U.S. Provisional Application No. 60/436,539, entitled, "Generating Prefetches by Speculatively Executing Code Through Hardware Scout Threading," by inventors Shailender Chaudhry and Marc Tremblay (filed 24 Dec. 2002). It is additionally described in U.S. Provisional Application No. 60/436,492, entitled, "Performing Hardware Scout Threading in a System that Supports Simultaneous Multithreading," by inventors Shailender Chaudhry and Marc Tremblay (filed 24 Dec. 2002). The above listed references are hereby incorporated by reference to provide details on how scout mode operates.

Unfortunately, because results are not committed to the architectural state of the processor, computational operations performed during scout mode need to be recomputed again, which can require a large amount of computational work.

When the original "launch point" stall condition is finally resolved, the system moves back into normal execution mode 202, and, in doing so, uses the previously generated checkpoint to resume execution from the launch point instruction (the instruction that initially encountered the stall condition).

Note that the launch point stall condition is the stall condition that originally caused the system to move out of normal execution mode 202. For example, the launch point stall condition can be a data-dependent stall condition that caused the system to move from normal execution mode 202 to execute-ahead mode 204, before moving to scout mode 208. Alternatively, the launch point stall condition can be a non-data-dependent stall condition that caused the system to move directly from normal execution mode 202 to scout mode 208.

When the system is in execute-ahead mode 204, if an unresolved data dependency is finally resolved, the system moves into deferred mode 206, wherein instructions are executed in program order from deferred buffer 112. During deferred mode 206, the system attempts to execute deferred instructions from deferred buffer 112. Note that the system attempts to execute these instructions in program order with respect to other deferred instructions in deferred buffer 112, but not with respect to other previously executed non-deferred instructions (and not with respect to deferred instructions executed in previous passes through deferred buffer 112). During this process, the system defers execution of deferred instructions that still cannot be executed because of unresolved data dependencies and places these again-deferred instruction back into deferred buffer 112. The system executes the other instruction that can be executed in program order with respect to each other.

After the system completes a pass through deferred buffer 112, if deferred buffer 112 is empty, the system moves back into normal execution mode 202. This may involve committing changes made during execute-ahead mode 204 and deferred mode 206 to the architectural state of the processor, if such changes have not been already committed. It may also involve discarding the checkpoint generated when the system moved into execute-ahead mode 204.

Figure 3:
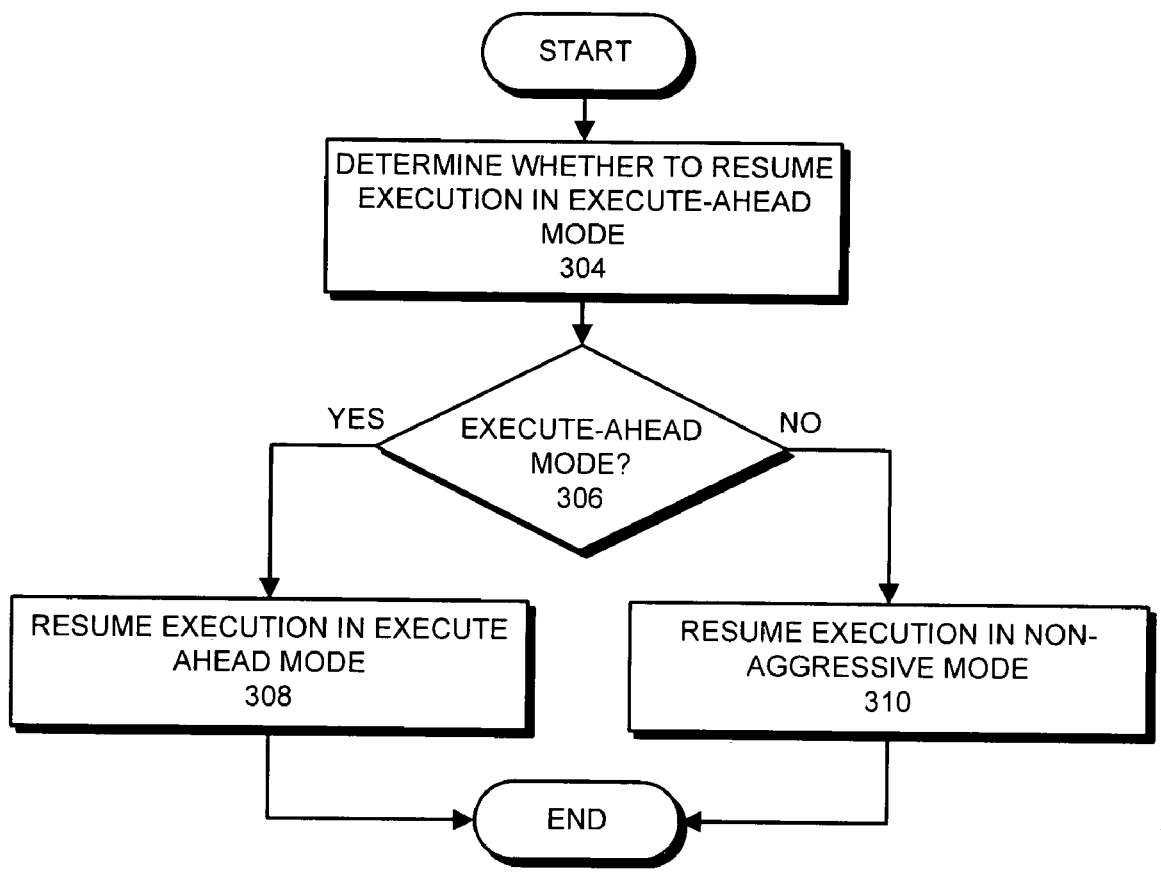
FIG. 3 presents a flow chart illustrating the process of determining whether to return to execute-ahead mode or to enter non-aggressive mode.

On the other hand, if deferred buffer 112 is not empty after the system completes a pass through deferred buffer 112, the system can perform a number of actions, which are illustrated in more detail in FIG. 3. The system first determines whether or not to resume execution in execute-ahead mode (step 304). If it determines to do so, the system resumes execution in execute-ahead mode from the point where the execute-ahead mode 204 left off (step 308). Otherwise, the system resumes execution in non-aggressive mode (step 310).

Resuming execution in non-aggressive mode can involve a number of different options. (1) In one embodiment of the present invention, resuming execution in non-aggressive mode involves returning to execute-ahead mode 204 to resume execution from the point where the execute-ahead mode 204 previously left off (see arc labeled "OPTION A" from deferred mode 206 to execute-ahead mode 204 in FIG. 2). However, if a non-data-dependent stall condition is encountered, instead of entering scout mode 208 the system waits for the non-data-dependent stall condition to be resolved (see loop labeled "OPTION A," which emanates from execute-ahead mode 204 in FIG. 2).

Note that if a large amount of computational work has been accomplished during execute-ahead mode, it may be wasteful to throw all of this work away by entering scout mode 208. Recall that in scout mode instructions are speculatively executed to prefetch future loads, but results are not committed to the architectural state of the execute-ahead processor. Hence, at the end of scout mode, the system has to resume execution from the last checkpoint, which in this case is the launch point where the execute-ahead mode was initially entered. Backing up to the last checkpoint discards all of the computational work that was accomplished during execute-ahead mode. Instead of discarding all of this work it may be preferable to not enter scout mode when a non-data-dependent stall condition is encountered, but to instead wait for the non-data-dependent stall condition to be resolved (or for a data-dependent stall condition to be resolved which causes the system to return the system to deferred mode).

In another embodiment of the present invention, in non-aggressive mode, the system does not return to execute-ahead mode, but instead remains in deferred mode 206, and waits until deferred buffer 112 empties before returning the normal execution mode 202 (see loop labeled "OPTION B," which emanates from deferred mode 206 in FIG. 2). Unlike OPTION A for non-aggressive mode, OPTION B does not accomplish additional work by returning to execute-ahead mode. However, OPTION B is simpler to implement, and it does not allow additional deferred instructions to be generated, which may further delay return to normal execution mode 202.

Determining Whether to Execute in Non-Aggressive Mode

In order to determine whether to resume execution in execute-ahead mode 204 (in step 304 in FIG. 3), the system can perform a number of different actions. The system can keep track of the number of instructions that have been executed in execute-ahead mode 204. If the number of instructions is greater than a threshold value, T, a significant amount of work has been accomplished and the system can enter non-aggressive mode to preserve the results of this work. Otherwise, if the number of instructions is less than T, the system can return to regular execute-ahead mode.

If during non-aggressive mode, the system is forced to wait for a significant number of cycles it may be beneficial to increase the threshold, T. For example, T can be increased by one instruction for every ten cycles of waiting. Or, alternatively, T can be increased by a factor of 1.1 for every 100 cycles of waiting.

If we decide not to enter non-aggressive mode and instead return to regular execute-ahead mode 204, and if a subsequent non-data-dependent stall condition causes the system to enter scout mode, we can adjust T upwards or downwards based upon the number of load misses encountered during scout mode. If very few load misses are encountered, then entering scout mode was not effective at prefetching data values, and the threshold T can be increased, so that the system is less likely to enter scout mode. On the other hand, if many load misses are encountered, scout mode was effective at prefetching data values, and the threshold T can be decreased so the system is more likely to enter scout mode.

Also, the value of T can self-increment or self-decrement in the absence of any feedback. This is useful if only one side of a reward-punishment scheme is easy to implement.

Other adjustment heuristics are possible. For example, the system can keep track of the threshold values for the last few decisions, and can store a table of threshold values indexed by bits of the program counter, much like commonly used branch prediction mechanisms.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically adjusting the aggressiveness of an execute-ahead processor, comprising:
   executing instructions in an execute-ahead mode, wherein instructions that cannot be executed because of an unresolved data dependency are deferred in a deferred buffer, and other non-deferred instructions are executed in program order, and wherein if a non-data-dependent stall condition is encountered, the execute-ahead processor enters a scout mode, wherein instructions are speculatively executed to prefetch future loads, but results are not committed to the architectural state of the execute-ahead processor;
   executing deferred instructions in a deferred mode in response to determining that an unresolved data dependency was resolved during the execute-ahead mode;
   waiting for the deferred buffer to empty in response to determining that an amount of work accomplished during the execute-ahead mode exceeds a predetermined threshold; and
   returning to a normal execution mode.

2. The method of claim 1, further comprising executing instructions in a non-aggressive execute-ahead mode, wherein if a non-data-dependent stall condition is encountered, the execute-ahead processor does not enter the scout mode, but instead waits for the non-data-dependent stall condition to be resolved, or for an unresolved data dependency to return, before proceeding.

3. The method of claim 1, wherein prior to executing instructions in the execute-ahead mode, the method further comprises entering the execute-ahead mode by:
   issuing instructions for execution in program order during the normal execution mode;
   upon encountering a first unresolved data dependency during execution of an instruction,
   generating a checkpoint that can subsequently be used to return execution to the point of the instruction, and
   executing subsequent instructions in the execute-ahead mode.

4. The method of claim 3, wherein if the first unresolved data dependency is finally resolved, the method further comprises using the checkpoint to resume execution in the normal execution mode.

5. The method of claim 1, wherein executing deferred instructions in the deferred mode involves:
   issuing deferred instructions for execution in program order;
   deferring execution of deferred instructions that still cannot be executed because of unresolved data dependencies; and
   executing other deferred instructions that are able to be executed in program order.

6. The method of claim 5, wherein if all deferred instructions are executed in the deferred mode, the method further comprises returning to the normal execution mode to resume normal program execution from the point where the execute-ahead mode left off.

7. The method of claim 1, wherein the unresolved data dependency is one of:
   a use of an operand that has not returned from a preceding load miss;
   a use of an operand that has not returned from a preceding translation lookaside buffer (TLB) miss;
   a use of an operand that has not returned from a preceding full or partial read-after-write (RAW) from store buffer operation; and
   a use of an operand that depends on another operand that is subject to an unresolved data dependency.

8. The method of claim 1, wherein the non-data-dependent stall condition is one of:
   a memory barrier operation;
   a load buffer full condition; and
   a store buffer full condition.

9. An apparatus that dynamically adjusts the aggressiveness of an execute-ahead processor comprising:
   an execution mechanism configured to:
      execute instructions in an execute-ahead mode, wherein instructions that cannot be executed because of an unresolved data dependency are deferred in a deferred buffer, and other non-deferred instructions are executed in program order, and wherein if a non-data-dependent stall condition is encountered, the execution mechanism is configured to enter a scout mode, wherein instructions are speculatively executed to prefetch future loads, but results are not committed to the architectural state of the execute-ahead processor;

execute deferred instructions in a deferred mode in response to determining that an unresolved data dependency was resolved during the execute-ahead mode;

wait for the deferred buffer to empty in response to determining that an amount of work accomplished during the execute-ahead mode exceeds a predetermined threshold; and to return to a normal execution mode.

10. The apparatus of claim 9, wherein, the execution mechanism is configured to execute instructions in a non-aggressive execute-ahead mode, wherein if a non-data-dependent stall condition is encountered, the execution mechanism does not enter the scout mode, but instead waits for the non-data-dependent stall condition to be resolved, or for an unresolved data dependency to return, before proceeding.

11. The apparatus of claim 9, wherein prior to executing instructions in the execute-ahead mode, the execution mechanism is configured to enter the execute-ahead mode by:

issuing instructions for execution in program order during the normal execution mode;

upon encountering an a first unresolved data dependency during execution of instruction,
  generating a checkpoint that can subsequently be used to return execution at to the point of the instruction, and
  executing subsequent instructions in the execute-ahead mode.

12. The apparatus of claim 11, wherein if the first unresolved data dependency is finally resolved, the execution mechanism is configured to use the checkpoint to resume execution in the normal execution mode.

13. The apparatus of claim 9, wherein while executing deferred instructions in the deferred mode, the execution mechanism is configured to:

issue deferred instructions for execution in program order;
defer execution of deferred instructions that still cannot be executed because of unresolved data dependencies; and to
execute other deferred instructions that are able to be executed in program order.

14. The apparatus of claim 13, wherein if all deferred instructions are executed in the deferred mode, the execution mechanism is configured to return to the normal execution mode to resume normal program execution from the point where the execute-ahead mode left off.

15. The apparatus of claim 9, wherein the unresolved data dependency is one of:

a use of an operand that has not returned from a preceding load miss;

a use of an operand that has not returned from a preceding translation lookaside buffer (TLB) miss;

a use of an operand that has not returned from a preceding full or partial read-after-write (RAW) from store buffer operation; and a use of an operand that depends on another operand that is subject to an unresolved data dependency.

16. The apparatus of claim 9, wherein the non-data-dependent stall condition is one of:

a memory barrier operation;

a load buffer full condition; and a store buffer full condition.

17. A computer system that dynamically adjusts the aggressiveness of an execute-ahead processor, comprising:

an execute-ahead processor;

a memory;

an execution mechanism within the execute-ahead processor configured to:

execute instructions in an execute-ahead mode, wherein instructions that cannot be executed because of an unresolved data dependency are deferred in a deferred buffer, and other non-deferred instructions are executed in program order, and wherein if a non-data-dependent stall condition is encountered, the execution mechanism is configured to enter a scout mode, wherein instructions are speculatively executed to prefetch future loads, but results are not committed to the architectural state of the execute-ahead processor;

execute deferred instructions in a deferred mode in response to determining that an unresolved data dependency was resolved during the execute-ahead mode;

wait for the deferred buffer to empty in response to determining that an amount of work accomplished during the execute-ahead mode exceeds a predetermined threshold; and to return to a normal execution mode.

18. The computer system of claim 17, wherein the execution mechanism is configured to execute instructions in a non-aggressive execute-ahead mode, wherein if a non-data-dependent stall condition is encountered, the execution mechanism does not enter the scout mode, but instead waits for the non-data-dependent stall condition to be resolved, or for an unresolved data dependency to return, before proceeding.

* * * * *

UNITED STATES PATENT AND TRADEMARK OFFICE
CERTIFICATE OF CORRECTION

| | |
|---|---|
| PATENT NO. | : 7,293,163 B2 |
| APPLICATION NO. | : 10/807093 |
| DATED | : November 6, 2007 |
| INVENTOR(S) | : Paul Caprioli |

It is certified that error appears in the above-identified patent and that said Letters Patent is hereby corrected as shown below:

In claim 11 (at column 9, line 24), please delete the word, "an".

In claim 11 (at column 9, line 25), please insert the word, --an-- so the line reads --during execution of an instruction--.

Signed and Sealed this

Eighteenth Day of March, 2008

JON W. DUDAS
*Director of the United States Patent and Trademark Office*